(12) United States Patent
Palin et al.

(10) Patent No.: US 8,215,575 B2
(45) Date of Patent: Jul. 10, 2012

(54) IN-LINE MILLING SYSTEM

(75) Inventors: Stephen C. Palin, Jamesville, NY (US); Jonathan Norman, Birdgeport, NY (US); Eric Fleckten, Kirkville, NY (US)

(73) Assignee: UCC Dry Sorbent Injection LLC, Waukegan, IL (US)

( * ) Notice: Subject to any disclaimer, the term of this patent is extended or adjusted under 35 U.S.C. 154(b) by 124 days.

(21) Appl. No.: 12/359,604

(22) Filed: Jan. 26, 2009

(65) Prior Publication Data

US 2009/0194618 A1 Aug. 6, 2009

Related U.S. Application Data

(60) Provisional application No. 61/023,584, filed on Jan. 25, 2008.

(51) Int. Cl.
*B02C 15/00* (2006.01)
*B02C 23/02* (2006.01)

(52) U.S. Cl. ................. 241/135; 241/152.2; 241/166

(58) Field of Classification Search ........... 241/134, 241/135, 152.1, 152.2, 166
See application file for complete search history.

(56) References Cited

U.S. PATENT DOCUMENTS

| | | | |
|---|---|---|---|
| 3,734,414 A * | 5/1973 | Weigel et al. | 241/40 |
| 4,026,479 A | 5/1977 | Bradburn et al. | |
| 4,691,869 A | 9/1987 | Onuma et al. | |
| 6,209,812 B1 * | 4/2001 | Jokinen | 241/81 |
| 6,615,750 B2 | 9/2003 | Durant et al. | |

* cited by examiner

*Primary Examiner* — Faye Francis
(74) *Attorney, Agent, or Firm* — George R. McGuire; Frederick J M Price; Bond Schoeneck & King

(57) ABSTRACT

The present invention provides an in-line system for milling sorbent material to be used in a pneumatic conveying system. The system provides for optimal particle size in a duct injection system, regardless of the original sorbent particle size, and is designed to prevent clogging of the milled material through the system. Methods of operation for milling, as well as cleaning the mills while providing various sorbent material by-pass configurations to minimize system down-time while enhancing material throughput and that support the unique aspects of the system, are also described in detail below.

4 Claims, 4 Drawing Sheets

IN-LINE MILLING SYSTEM

RELATED APPLICATION

The present application claims priority to U.S. provisional patent application No. 61/023,584, filed on Jan. 25, 2008; all of the foregoing patent-related document(s) are hereby incorporated by reference herein in their respective entirety(ies).

BACKGROUND OF THE INVENTION

1. Field of Invention

The present invention relates to the milling of product for use as a sorbent in a pneumatic conveying system. More specifically, the invention relates to an in-line system for milling (see DEFINITIONS section), and methods of operation for milling that support the unique aspects of the system.

2. Description of Prior Art

The market for air pollution control (APC) technology has grown tremendously since the Environmental Protection Agency (EPA) began to enforce more stringent standards via the Clean Air Act and its multiple rounds of amendments (most recently in 1990). According to BCC Research, "the total global air pollution mitigation market was worth $59.3 billion in 2006, and will reach $83.5 billion in 2007. By 2012, it is estimated that the global market will be worth over $138 billion, a compound annual growth rate (CAGR) of 10.6%." Thus, air pollution control devices have become nearly a ubiquitous component of industrial facility design and operation, and technology improvements are constantly needed in this area.

Specific pollutants such as SOx and NOx which contribute to haze, acid rain, and ozone issues have become the focus of the Clean Air Interstate Rule (CAIR). State-enforced standards have been developed based on federal requirements defining: (i) reasonably available control technology (RACT); and (ii) maximum achievable control technology (MACT) standards. Coal-fired power plants, as well as industrial/institutional boilers and other fossil fuel fired systems, contribute a large volume of SOx and NOx emissions, if not properly controlled. Although flue gas desulphurization (FGD) is effective in controlling $SO_2$ to some degree, it is less effective upon $SO_3$ emissions, which create a visible haze via stack emissions from the plant. An APC technology that can control both $SO_2$ and $SO_3$ emissions effectively is needed.

Cost is another issue in reducing emissions from coal-fired power plants. Many existing plants have already been retrofitted with very expensive FGD systems. Further capital cost to meet the standards and remove the SO3 haze and gases is prohibitive for many plants. What is needed is a lower cost solution to achieve the additional reduction in $SO_3$ emissions and remove the stack emission haze and gases.

It has been found that injection of chemical sorbents, sulfur-absorbing materials, into the flue gas duct is an effective approach to reduce both $SO_2$ and $SO_3$ emissions from coal-fired power plants. Sodium bicarbonate, and hydrated lime can be used to absorb the gaseous sulfur and reduce SOx stack emissions. However, many sorbents are prone to binding and agglomeration making them difficult to work with. Another material found to be quite effective as an injected sorbent is trona/sodium bicarbonate, a naturally occurring sodium sesquicarbonate product. Trona/sodium bicarbonate and sodium bicarbonate can be quite expensive, but if the material is milled to a smaller particle size, the material becomes more cost-effective and more efficient in the process (milling the sorbent creates greater surface area for absorption). However, there are two technical challenges of milled trona/sodium bicarbonate or sodium bicarbonate. First, trona/sodium bicarbonate/sodium bicarbonate suppliers provide a wide variety of particle size in their specific product. This makes it difficult for a single duct injection system to accommodate multiple trona/sodium bicarbonate sources, and some particle diameter ranges may not even be usable in the system. Second, if the trona/sodium bicarbonate is pre-milled by the supplier, it is more difficult to handle and does not flow properly. Additionally, trona/sodium bicarbonate can agglomerate and clog delivery and piping systems. What is needed is a solution that accommodates a variety of trona/sodium bicarbonate particle sizes, and in addition does not cause additional problems with transport and injection of a milled trona/sodium bicarbonate product.

Some sorbent materials (see DEFINITIONS section) that have been proposed and/or used conventionally include: (i) sodium bicarbonate; (ii) dry hydrated lime; (iii) carbon; and/or (iv) trona.

SUMMARY OF THE INVENTION

As the inventor(s) have recognized, in a high volume throughput system for sorbent delivery and duct injection, several other challenges need to be addressed. The high volume of material being processed, and the need for continuous delivery of sorbent into the system increases the need to minimize downtime required for cleaning. Cleaning the sorbent material routinely from the system is needed to ensure that good system performance is maintained. However whenever the sorbent is not being delivered to the duct for emission control, no treatment is being applied to the emissions from the facility, which is not preferable. Therefore there is a need to not only minimize the downtime of the sorbent milling and delivery system, but also a need to design the system such that sorbent delivery never stops as long as the facility is operating.

A further challenge is the cleaning method itself. Water proves to be a preferred substance for flushing residual sorbent from the mill; however, introducing water risks additional moisture and humidity to be conveyed downstream of the mill and can cause unwanted agglomeration of sorbent material in the system. The conveying system needs to be free of water for proper operation. Therefore there is a need to thoroughly dry the mill after flushing with water in order to maintain good system performance after a cleaning cycle. Further, if heat is used to dry the mill after a cleaning cycle, the temperature must be controlled as high temperatures can degrade the sorbent material chemistry and reduce its efficacy. Therefore there is a need to design the cleaning and drying cycles to avoid negative sorbent performance impacts.

According to the present invention, an in-line system for milling sorbent material to be used in a pneumatic conveying system is provided. The system provides for optimal particle size in a duct injection system, regardless of the original sorbent particle size. The system is designed to prevent clogging of the milled material through the system. Inventive methods of operation for milling are described in detail below. Inventive methods of cleaning the mills while providing various sorbent material by-pass configurations to minimize system down-time while enhancing material throughput are described in detail below.

Various embodiments of the present invention may exhibit one or more of the following objects, features and/or advantages:

(i) it is an object of the invention to provide an improved APC system;

(ii) it is another object of the invention to provide an APC technology that can control both $SO_2$ and $SO_3$ emissions effectively;

(iii) it is another object of the invention to further ensure the capital expenditure for the APC technology is sufficiently low to implement in plants that have already invested in large APC systems, such as FGD systems or to implement in smaller/older plants that cannot economically employ higher capital cost technology;

(iv) it is another object of the invention to increase the utilization of costly trona/sodium bicarbonate sorbents, therefore reducing operating costs for the APC system;

(v) it is another object of the invention to accommodate a variety of trona/sodium bicarbonate particle sizes, and in addition avoid problems with clogging, relative to transport and injection of a milled trona/sodium bicarbonate product;

(vi) it is another object of the invention to minimize the downtime of the sorbent milling and delivery system;

(vii) it is another object of the invention to provide a design that supports continuous sorbent delivery as long as the facility is operating;

(viii) a further object of the invention to provide a system to thoroughly dry the mill after flushing with water in order to maintain good system performance after a cleaning cycle;

(ix) it is yet a further objects of the invention to incorporate design features to enable: (1) cleaning the system without introducing water downstream to minimize downtime for the system during cleaning, and (2) allowing for a variety of material bypass options to provide the most flexibility in milling, while increasing the material throughput, and minimizing system downtime;

(x) it is another object of the invention to design the cleaning and drying cycles to avoid negative sorbent performance impacts.

According to the present invention, a system for processing sorbent material includes a set of non-fully-milled sorbent material supply sub-system(s), a first mill, a second mill and a duct. The set of non-fully-milled sorbent material supply sub-system(s) include a first non-fully-milled sorbent material supply sub-system. Each non-fully-milled sorbent material supply sub-system is structured to supply sorbent material in a non-fully-milled state. The first mill is structured and located to receive non-fully-milled sorbent material from the set of non-fully-milled sorbent material supply sub-system(s) and to mill the non-fully-milled sorbent material to make milled sorbent material. The second mill is structured and located to receive non-fully-milled sorbent material from the set of non-fully-milled sorbent material supply sub-system(s) and to mill the non-fully-milled sorbent material to make milled sorbent material. The duct structured and located to receive milled sorbent material from at least the first mill and the second mill.

According to a further aspect of the present invention, a system for processing sorbent material includes a set of non-fully-milled sorbent material supply sub-system(s), a first mill, a second mill, a duct and an electronic controller. The set of non-fully-milled sorbent material supply sub-system(s) includes at least a first non-fully-milled sorbent material supply sub-system. Each non-fully-milled sorbent material supply sub-system(s) is structured to supply sorbent material in a non-fully-milled state. The first mill is structured and located to receive non-fully-milled sorbent material from the set of non-fully-milled sorbent material supply sub-system(s) and to mill the non-fully-milled sorbent material to make milled sorbent material. The second mill is structured and located to receive non-fully-milled sorbent material from the set of non-fully-milled sorbent material supply sub-system(s) and to mill the non-fully-milled sorbent material to make milled sorbent material. The duct is structured and located to receive milled sorbent material from at least the first mill and the second mill. The electronic controller is structured, connected and/or programmed to control the milling operation of the first mill and the milling operation of the second mill.

According to a further aspect of the present invention, a method for processing sorbent material includes the following steps (but not necessarily in the following order or in a serial manner at all): (a) supplying not-fully-milled sorbent material to a first mill; (b) supplying not-fully-milled sorbent material to a second mill; (c) milling, by the first mill, the not-fully-milled sorbent material supplied at step (a) to form milled sorbent material; (d) milling, by the second mill, the not-fully-milled sorbent material supplied at step (b) to form milled sorbent material; (e) injecting, into a duct, the milled sorbent material formed at step (c); and (f) injecting, into the duct, the milled sorbent material formed at step (d). These steps should only be considered to be in order, performed serially and/or performed concurrently to the extent: (i) explicitly set forth; or (ii) as necessarily implied by the subject matter of the method.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
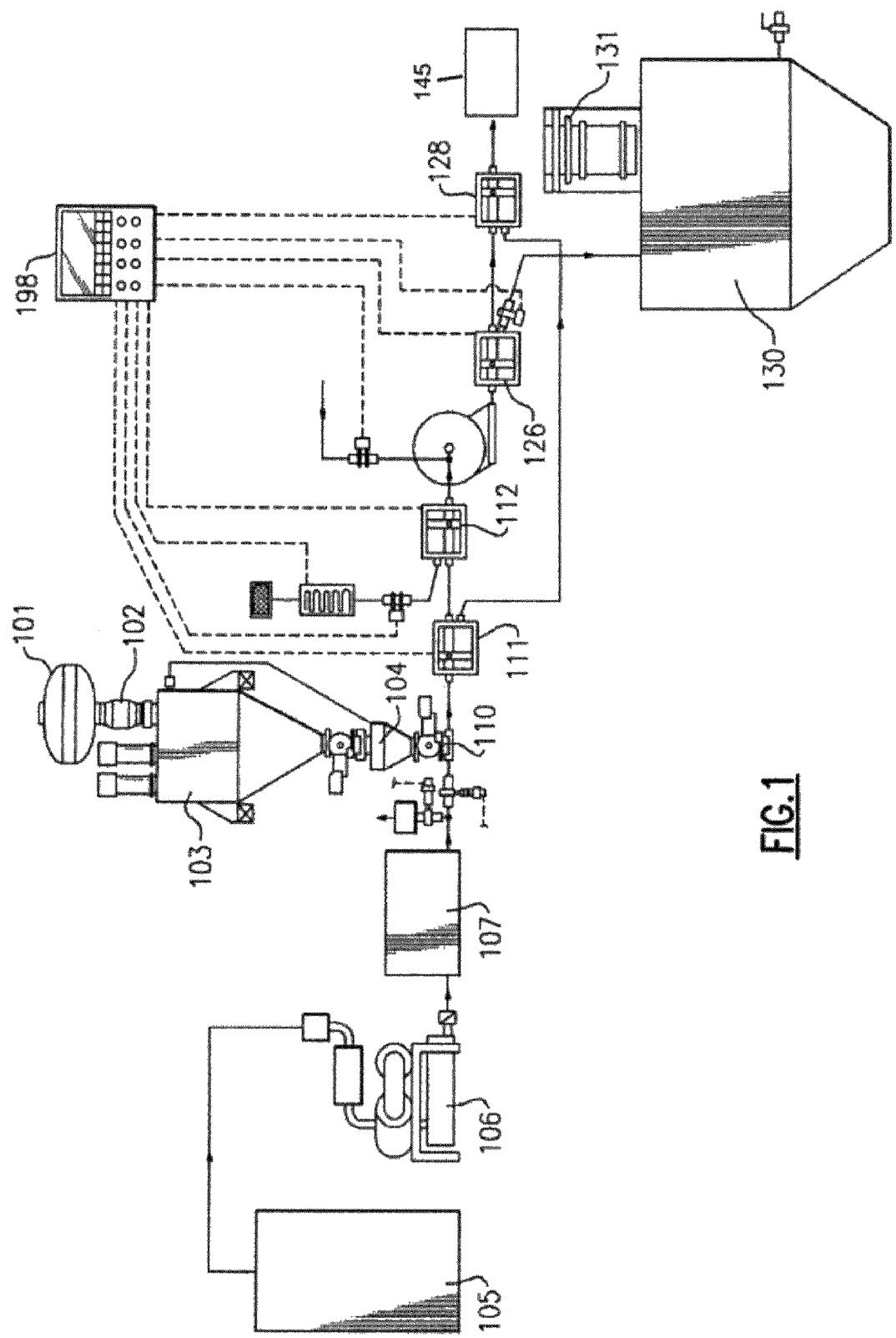
FIG. 1 is a schematic view that illustrates a first embodiment of an in-line system for milling sorbent material to be used in a pneumatic conveying system, according to a first embodiment.

Reference will now be made in detail to the present preferred embodiments of the invention, wherein like reference numerals refer to like components, examples of which are illustrated in the accompanying drawings.

Turning to FIG. 1, a schematic view that illustrates an in-line system 100 for milling sorbent material to be used in a pneumatic conveying system according to a first embodiment of the present invention is shown. Sorbent material (not shown) enters system 100 via scalping screener 101, passes through metal separator 102 into loss-in-weight feeder 103. From loss-in-weight feeder 103, sorbent material passes through transitional vent hopper 104 into a two-way diverter assembly 110. A conditioned air stream (not shown) is provided to two-way diverter assembly 110 via dryer/chiller 105, PD blower 106, and air to air heat exchanger 107.

Within two-way diverter assembly 110, "A" diverter 111 allows sorbent material to flow toward mill 125, or diverts it as a bypass line toward "D" diverter 128 which then passes milled sorbent material through toward the duct injection site 145. "B" diverter 112 directs sorbent material into mill 125, but also acts as a converging diverter to allow air into mill 125 via the assembly of atmospheric air inlet 114 and air heater 115, and first butterfly valve 113.

Sorbent material enters mill 125, which processes the sorbent material to a milled sorbent material having a reduced diameter. Milled sorbent material exits mill 125 and flows into "C" diverter 126, where the milled sorbent material is then routed into "D" diverter 128. "D" diverter 128 passes milled sorbent material through toward the duct injection site (not shown). In the case when "A" diverter 111 is in bypass mode, unmilled sorbent material passes through "D" diverter 128 and into the duct, to provide a continuous path for sorbent to flow through the system 100 even during cleaning cycles. To clean mill 125, water is supplied through line 121 and delivery is controlled via ball valve 135.

In accordance with an embodiment of the present invention, a method of operation of the in-line milling system 100 is provided. In operation, the mill system 100 processes sorbent material as follows. Scalping screener 101 protects the mill 125 by removing large debris, which may consist of wood, pieces of metal or other debris, that could damage the mill or other downstream apparatus if left in the incoming sorbent material stream. Scalping screener 101 also acts as a silo to feed the system 100. Examples of such equipment are made by Russell Finex and Eriez. In a second screening step, finer pieces of metal are magnetically removed by metal separator 102, such as those made by Eriez, to protect the overall system and specifically the mill 125. The loss-in-weight hopper 103 helps to manage the overall feed rate into the system 100, by measuring material via load cells and an air lock controlled by a variable frequency drive. The sorbent material passes through a small transitional vent hopper 104, using a rotary valve to adjust the rate at which material passes into the convey line leading to the 2-way diverter assembly 110. Dryer/chiller 105 (manufactured by companies such as Munters) dries the air provided to the pressure differential (PD) blower 106 (such as Gardner Denver's DuroFlow line), but also chills the air that has been heated in the drying process, prior to passing to the inlet of PD blower 106. The discharge of air from PD blower 106 is further conditioned using an air to air heat exchanger 107, such as those manufactured by Xchanger. As previously noted, the air temperature must be controlled in order to avoid physical degradation of the sorbent (e.g. via calcining). It should be noted that the screener, magnet, heat exchanger, and dehumidifier are preferred components but are not required for the system to operate.

The conditioned air from air to air heat exchanger 107 and the sorbent material from transitional vent hopper 104 enter the 2-way diverter assembly 110. Each diverter (111, 112, 127, and 128) in 2-way diverter assembly 110 was designed by Nol-Tec specifically for use in system 100 to selectively control flow direction of liquid and/or entrained sorbent materials, and is constructed of urethane designed and tested to withstand 80 psi of water pressure. Following the flow of sorbent material, "A" diverter 111 can either pass sorbent material into "B" diverter 112, or if a cleaning and drying cycle is taking place, "A" diverter 111 can bypass mill 125 and flows directly to the duct via "D" diverter 128 as unmilled sorbent.

"B" diverter 112 either delivers sorbent material into mill 125, or if the flow has been diverted for a cleaning and drying cycle, "B" diverter 112 delivers air via the assembly of atmospheric air inlet 114 and air heater 115, and first butterfly valve 113.

During normal milling operations, sorbent material passes through mill 125, through "C" diverter 126 into "D" diverter 128 and into the duct system. In a cleaning and drying cycle, water is injected into mill 125 via line 121 and ball valve 135, and in this case "C" diverter 126 directs the sorbent material and water slurry into receiving tank 130 for reclamation or proper disposal. The contents of receiving tank 130 may be removed for treatment, or may further be routed to an on-site treatment system (not shown). Potential dust emissions from receiving tank 130 are controlled via bin vent 131.

Finally "D" diverter 128 either delivers milled sorbent material to the duct system from mill 125 via "C" diverter 126, or alternatively delivers unmilled trona/sodium bicarbonate to the duct system when mill 125 is not operational. While this may not be the most ideal use of the sorbent material, and likely requires an increase in flow rate to meet emissions requirements, it is still an improvement in emissions reductions compared to not supplying sorbent to the duct at all during cleaning and drying cycles.

In accordance with an embodiment of the present invention, a method of cleaning the mill 125 is provided. The method of cleaning mill 125 uniquely addresses the problems of minimizing downtime, removing adhered sorbent from the interior of mill 125, and drying mill 125 after cleaning so no additional moisture is introduced to the system. This method is critical to maintain best operation of the mill by ensuring (1) the milling is able to achieve the desired milled sorbent particle diameter, (2) energy costs are minimized (accumulated sorbent in mill 125 elevates the energy demand to run the apparatus) and (3) that in turn the milled sorbent will perform as expected in reducing $SO_x$ emissions.

Several approaches may be used to determine frequency and schedule for cleaning. The power draw to mill 125 increases with material buildup and reduces efficiency and cost-effectiveness. Therefore the cleaning should be sufficiently frequent to avoid unnecessary use of power, but limited to when needed due to the downtime for sorbent milling. In one example, empirical evidence is used to measure the length of time from when mill 125 begins operation "clean", to the point at which energy demand to run mill 125 is prohibitively high. This length of time can be used to set a schedule, or a timer, for initiating cleaning cycles.

In a second example, a more continuous measurement approach is used. A control system (not shown) detects the condition of mill 125 and reports on this condition, so that the frequency of cleaning can be determined (and possibly even initiated automatically). Power draw to mill 125 may be measured and a threshold level determined for triggering the need to clean mill 125. Alternatively, the threshold of accumulated buildup can be related to the volume of sorbent material processed, such that the loss-in-weight feeder 103 load cells may be used to measure and trigger the need to clean mill 125.

In general, one process for cleaning mill 125 consists of injecting water into mill 125 via water injection line 121 and ball valve 135. The water is circulated through mill 125, drained via "C" diverter 126 and routed to receiving tank 130. However, due to the high volume throughput of the system 100 and the need to coordinate all equipment in the system, the actual method is more complex. A method 200 of cleaning mill 125 consists of the following steps:

Step 201: Stopping sorbent material feed and air system— The flow of sorbent material will be stopped by stopping the loss-in-weight rotary airlock, and then stopping the vent hopper rotary airlock. The vent butterfly valve at the discharge of the heat exchanger will be opened to permit PD blower air to discharge to atmosphere. The convey line butterfly valve will then be closed to isolate the PD blower air from the remainder of the convey line. The air operated butterfly valve at the discharge of the diverter "C" can be opened to permit rinseate to drain to receiving tank. (Note: it should be understood that although the two butterfly valves are not illustrated as air operated valves which would be controlled by the PLC 198, but they could be so operated.) PLC 198 is in the form of an electronic controller and, more preferably in the for of a computer-based controller. The four diverters "A" "B": "C" and "D" can be operated simultaneously to make the bypass of unmilled trona/sodium bicarbonate and liquid fill of the mill. The dryer/chiller, PD Blower, and heat exchanger can remain operational to minimize trona/sodium bicarbonate convey down time during the switching of diverters to bypass unmilled trona/sodium bicarbonate during the cleaning cycle.

Step 202: Verifying a "no-flow" condition—Via visual, mechanical, or electrical detection means, an operator confirms that both sorbent material and air flow has stopped.

Step 203: Opening air inlet 114, toggling "B" diverter 112, and toggling "C" diverter 126; confirming toggled condition—Mill 125 will require continuous air flow to conduct a cleaning cycle. Therefore atmospheric air is provided to mill 125 by air inlet 114 but requires "B" diverter 112 to be switched to allow flow from air input 114 but not from "A" diverter 111. "C" diverter 126 is also required to be toggled to pass water used for cleaning to receiving tank 130 after flushing mill 125, instead of passing material through to "D" diverter 128 and on to the duct. AS an option, off-leg of "C" diverter air operated butterfly valve must be closed during the mill cleaning cycle to retain water solution in the mill. This is an important step that provides the ability to clean mill 125 without introducing moisture to "D" diverter 128 and downstream in the system. Via visual, mechanical, or electrical detection means, an operator confirms that the flow through both "B" diverter 112 and "C" diverter 126 has been successfully switched as described.

Step 204: Toggling "A" diverter 111 and "D" diverter 128; confirming toggled condition—To divert the flow of sorbent away from the mill and directly to the duct as unmilled sorbent, "A" diverter 111 is switched to divert sorbent material that flows from the rotary airlock vent hopper 104 to "D" diverter 128, where the switched position of "D" diverter 128 accepts flow from "A" diverter 111 and delivers the unmilled sorbent to the duct (not shown). Via visual, mechanical, or electrical detection means, an operator confirms that the flow through both "A" diverter 111 and "D" diverter 128 has been successfully switched as described.

As stated above, the blower system operates continuously and will not have to be restarted. This will minimize switch over time from milled materials injection to unmilled trona/sodium bicarbonate injection and vice versa.

Step 206: Restarting sorbent material feed and verifying a "flow" condition—Similarly, the sorbent material flow is restarted and sorbent flow is verified via visual, mechanical or electrical means.

Step 207: Providing pre-allocated amount of water to mill 125; washing mill 125 with water—Once the system 100 is ready for the washing cycle, a pre-allocated amount (for example by volume or by duration of flow) is provided through water injection line 121 by opening ball valve 122. The water is agitated in mill 125 (it maintains operation throughout the entire cleaning cycle) and rinses accumulated sorbent material from the inside of mill 125. The air operated butterfly valve at the discharge of diverter "C" can be operated to permit reinstate to drain to receiving tank. The rinseate (water and sorbent material) flows out of mill 125 through "C" diverter 126 into receiving tank 130.

Step 208: Stopping water flow—After the cleaning cycle is complete (for example, a pre-determined length of time based on empirical tests and size of mill), ball valve 122 is closed to stop water flow, and atmospheric vent 114 remains open to permit air flow to continue through the mill.

To determine when the drying cycle is complete, the humidity (moisture) within mill 125 may be measured. Alternatively, a specific length of drying time can be empirically derived and used as a measurement of when to complete the drying cycle.

Step 210: Stopping sorbent material feed; operation of dryer/chiller 105, PD blower 106, and heat exchanger 107—The entire system 100 is to be switched back to in-line milling operation after mill 125 is clean and dry. The flow of sorbent material must be stopped before diverting flow back to the mill.

Step 211: Verifying a "no-flow" condition—Via visual, mechanical, or electrical detection means, an operator confirms that both sorbent material and air flow has stopped.

Step 212: Closing air inlet 114, toggling "B" diverter 112, and toggling "C" diverter 126—The flow of atmospheric air is stopped by closing air inlet 114 but requires "B" diverter 112 to be switched to allow flow from "A" diverter 112. "C" diverter 126 is also required to be toggled to "D" diverter 128 and on to the duct. This is an important step that provides the ability to quickly switch back to full milling operation with minimal downtime and waste of sorbent material. If mill 125 is very briefly starved for air (e.g., less than one minute) this will not harm operation of mill 125. Via visual, mechanical, or electrical detection means, an operator confirms that the flow through both "B" diverter 112 and "C" diverter 126 has been successfully switched as described.

Step 213: Toggling "A" diverter 111 and "D" diverter 128; confirming toggled condition—To divert the flow of sorbent back to the mill and away from the duct, "A" diverter 111 is switched to divert sorbent material that flows from the rotary airlock vent hopper 104 to "B" diverter 112, where the switched position of "B" diverter 112 accepts flow from "A" diverter 111 and delivers the sorbent to mill 125. Similarly, "D" diverter 128 is switched from accepting sorbent material from "A" diverter 111 to accepting milled sorbent from "C" diverter 126. Via visual, mechanical, or electrical detection means, an operator confirms that the flow through both "A" diverter 111 and "D" diverter 128 has been successfully switched as described.

Step 214: Restarting Operation of air system—Open the convey line butterfly valve and close the atmospheric vent to restart operation of the air system.

Step 215: Restarting sorbent material feed and verifying a "flow" condition—Now that all four diverters (111, 112, 126, and 128) have been confirmed as switched, the system 100 operations can restart, and milling of sorbent can proceed.

Step 216: Method 200 ends—Method 200 demonstrates how the invention provides for minimal downtime, supports continuous sorbent delivery, thoroughly dries the mill after cleaning to maintain good system performance, and avoids negative sorbent performance impacts.

In accordance with an embodiment of the present invention, a method of supplying water and disposal or reclamation of rinseate is provided. As described in Step 207 of Method 200, a pre-allocated amount (for example by volume or by duration of flow) of water is provided through water injection line 121. The water can be provided on-site at the facility, or alternatively can be provided via a mobile tank unit placed on-site. The on-site tank may also optionally have capacity for storing rinseate for disposal. After the cleaning cycle is complete, rinseate (water and sorbent material) flows out of mill 125 through "C" diverter 126 into receiving tank 130. The rinseate may be either disposed or treated and reused in the process.

In one example, the rinseate may be discharged directly to a sewer (as long as the liquid meets disposal and applicable permit requirements), or may require some treatment prior to discharge to a sewer.

In another example, the rinseate is treated with known methods to reclaim the sorbent material (e.g. through settling and/or membrane treatment) and the water may either be discharged, or can be reused for repeated mill 125 cleaning cycles.

In a third example, the rinseate in receiving tank 130 is transferred to a mobile tank (not shown) and shipped off-site for disposal.

While cleaning mills with water is a preferred mode for practicing the invention, a dry cleaning agent could also be employed in a manner similar to that of using water. In addition, the mills could also be cleaned by taking the mill to be cleaned off-line, and reversing its direction. The agglomerated sorbent would then be ejected from the mill through this reversal of mill direction.

Note that system 100 and method 200 apply to a configuration where one mill 125 is included in the design for milling sorbent material. It can easily be seen by those skilled in the art that there exist numerous other arrangements of mill units (e.g. including a plurality of mills 125) in series or in parallel to achieve specific overall desired operational set points.

Figure 2:
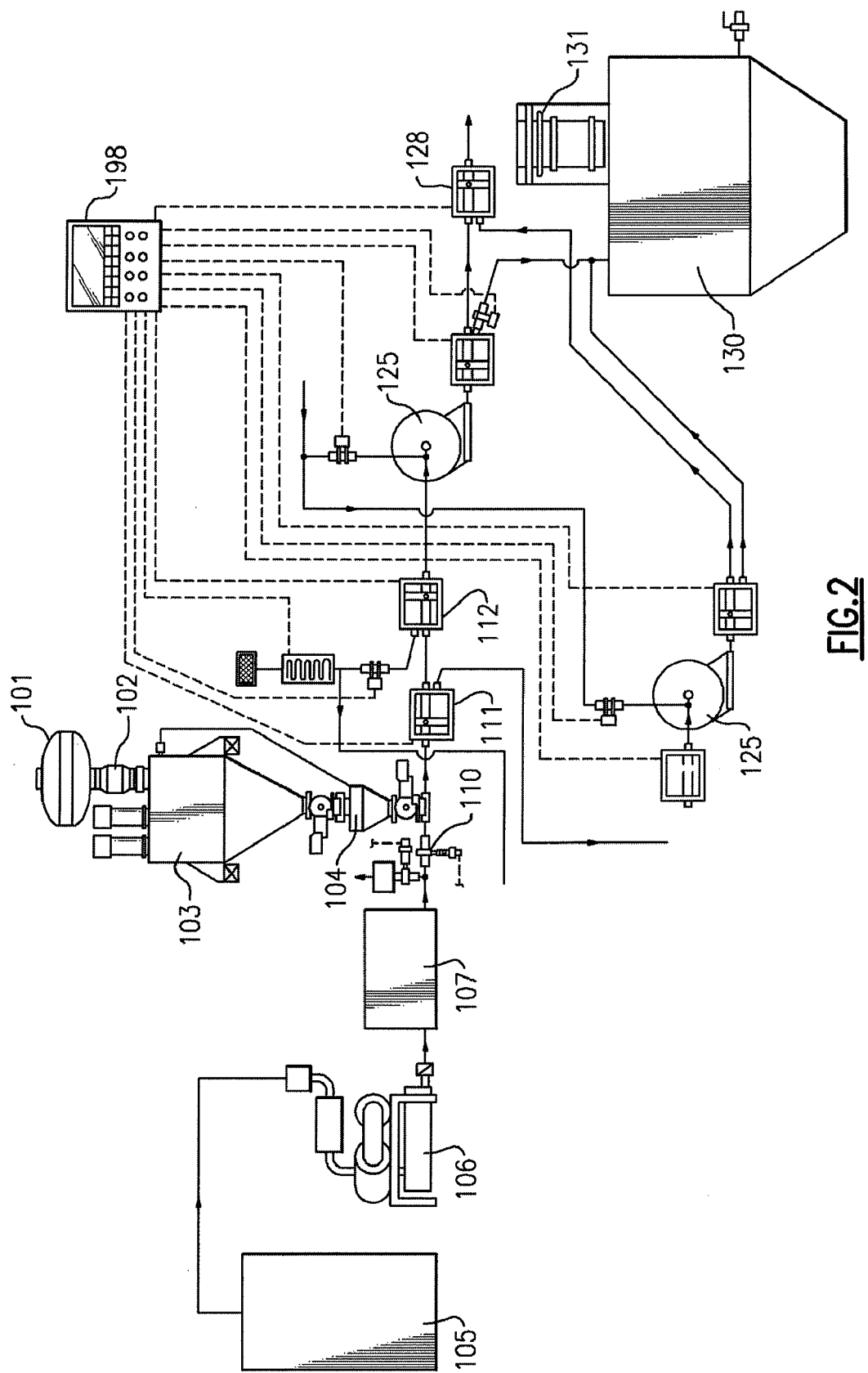
FIG. 2 is a schematic view that illustrates a second embodiment of an in-line system for milling sorbent material to be used in a pneumatic conveying system, according to a second embodiment of the present invention.
Figure 3:
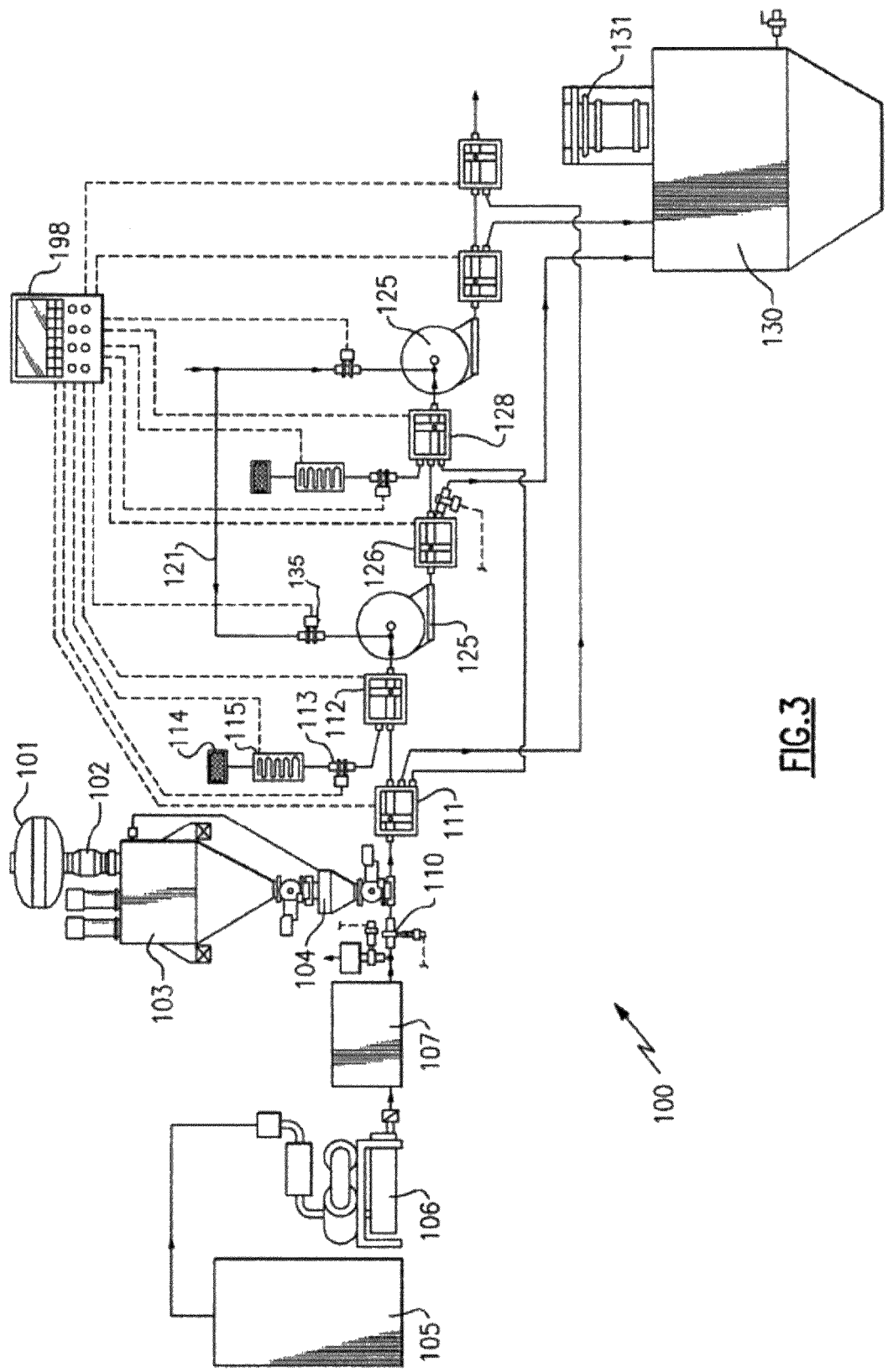
FIG. 3 is a schematic view that illustrates a third embodiment of an in-line system for milling sorbent material to be used in a pneumatic conveying system, according to a third embodiment of the present invention.

In one example, an identical mill 125 is placed downstream of PD blower 106 with no other changes to system 100 required. Two mill units 125 in parallel (FIG. 2) or series (FIG. 3) would allow for continuous milling of sorbent without the need to divert unmilled sorbent to the duct. The arrangement of diverters (such as 111, 112, 126, and 128) would also be changed to support the same functions of system 100, namely that continuous or nearly continuous milling operation is possible, with proper particle diameter of sorbent being delivered to the duct, and minimal downtime or minimal negative impact of the cleaning cycle observed.

Figure 4:
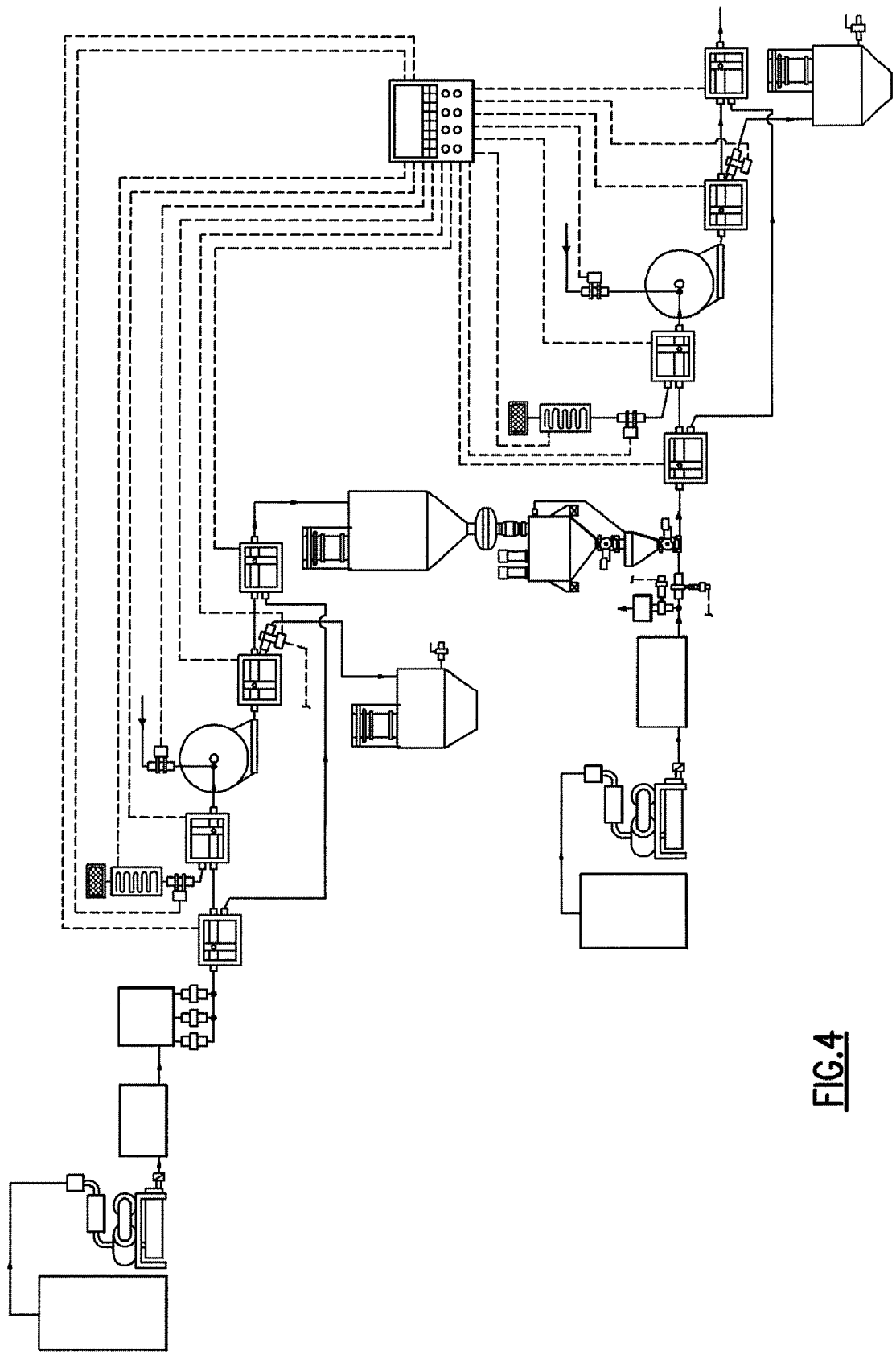
FIG. 4 is a schematic view that illustrates a fourth embodiment of an in-line system for milling sorbent material to be used in a pneumatic conveying system, according to an embodiment.

In another example illustrated in FIG. 4, larger particle size sorbent is routed through a two-step milling process to reduce the sorbent to a usable diameter (Note: The goal of all particle-sizing techniques is to provide a single number that is indicative of the particle size. However, particles are three-dimensional objects for which at least three parameters (length, breadth and height) are required in order to provide a complete description. Most sizing techniques therefore assume that the material being measured is spherical, and report the particle size as the diameter of the "equivalent sphere" which would give the same response as the particle being measured.) In this example, a "pre-mill" is designed to provide a rough cut (for example, reducing particle diameter from about 300 microns to 50-70 microns). However this modified pre-mill can handle four times the capacity of mill 125, and thus can be used directly upon delivery to the site from rail car or storage without slowing transport. The pre-mill is designed to both optimize in-flow rate (order of magnitude higher than in-process) and achieve correct particle diameters. Due to the higher flow rate, an increased, conditioned atmospheric air flow is required for delivery through this step. After the pre-milling step is conducted, the remainder of system 100 and method 200 remains the same.

It should be noted that the present system has been designed to work with a variety of mill types, including turbine and cutter mills; turbine and screen mills; and pin mills.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

DEFINITIONS

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

sorbent material: any material now known or to be developed in the future in the form of solid particles suitable to absorb pollutant(s) out of an airstream, including sorbent material that absorb pollutant(s) by chemical action and sorbent materials that absorb pollutant(s) by physical action.

mill: any device now known or to be developed in the future that makes particles of sorbent material smaller by any kind of mechanical action, without regard to: input particle dimensions, output particle dimensions, uniformity of input particle dimensions, uniformity of output particle dimensions, degree of reduction in particle size and/or throughput; mills include, but are not limited to turbine and cutter mills, turbine and screen mills, and pin mills.

non-fully-milled sorbent material: sorbent material that is unmilled or pre-milled, but that should optimally be further milled before delivery into a duct.

sorbent material supply sub-system: any sub-system now known or to be developed in the future for supplying sorbent material at a fixed on-site location in an at least substantially continuous manner; a sorbent material supply sub-system may include, but does not necessarily include one or more of the following components: a dryer; a chiller; a dryer/chiller; a PD blower; a heat exchanger; a scalping screener; a metal separator; a feeder (for example, a loss-in-weight feeder); a vent; a diverter; a valve; a hopper; and/or sorbent material conveying passages.

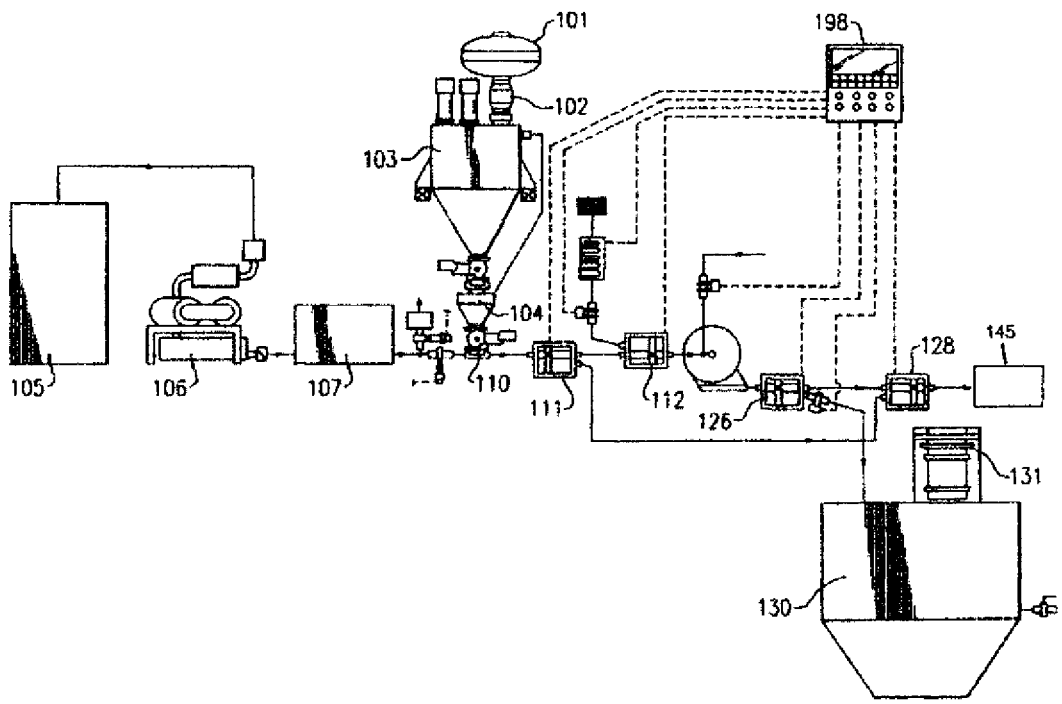

What is claimed is:

1. A system for processing sorbent material, the system comprising:
    a non-fully-milled sorbent material supply system comprising at least a first non-fully-milled sorbent material supply sub-system comprising a first diverter structured or located to supply sorbent material in a non-fully-milled state, and in a plurality of non-sorbent material size dependent pathways;
    a first mill structured and located to receive non-fully-milled sorbent material from the non-fully-milled sorbent material supply system and to mill the non-fully-milled sorbent material to make milled sorbent material;
    a second mill structured and located to receive non-fully-milled sorbent material from the non-fully-milled sorbent material supply system and to mill the non-fully-milled sorbent material to make milled sorbent material;
    a duct structured and located to receive milled sorbent material from at least the first mill and the second mill;
    wherein the first mill and the second mill have at least substantially the same performance characteristics; and
    a serial mill feed stream, wherein:
    the non-fully-milled sorbent material supply system comprises a first sorbent output stream structured and located to supply non-fully-milled sorbent material directly into the first mill; and
    the serial mill feed stream is structured and located to receive sorbent material directly from the first mill and to supply sorbent material directly into the second mill.

2. The system of claim 1 further comprising a first mill bypass stream structured and located to supply sorbent material to the second mill in a way that bypasses the first mill.

3. A system for processing sorbent material, the system comprising:
- a non-fully-milled sorbent material supply system comprising at least a first non-fully-milled sorbent material supply sub-system comprising a first diverter structured or located to supply sorbent material in a non-fully-milled state, and in a plurality of non-sorbent material size dependent pathways;
- a first mill structured and located to receive non-fully-milled sorbent material from the non-fully-milled sorbent material supply system and to mill the non-fully-milled sorbent material to make milled sorbent material;
- a second mill structured and located to receive non-fully-milled sorbent material from the non-fully-milled sorbent material supply system and to mill the non-fully-milled sorbent material to make milled sorbent material;
- a duct structured and located to receive milled sorbent material from at least the first mill and the second mill;
- wherein the first mill and the second mill have at least substantially the same performance characteristics;
- a first cleaning stream structured and located to feed a stream of cleaning fluid through the first mill; and
- a second cleaning stream structured and located to feed a stream of cleaning fluid through the second mill.

4. The system of claim 3, further comprising a receiving tank is structured and located to receive used cleaning fluid from the first cleaning stream and from the second cleaning stream.

* * * * *

UNITED STATES PATENT AND TRADEMARK OFFICE
CERTIFICATE OF CORRECTION

| | | |
|---|---|---|
| PATENT NO. | : 8,215,575 B2 | Page 1 of 1 |
| APPLICATION NO. | : 12/359604 | |
| DATED | : July 10, 2012 | |
| INVENTOR(S) | : Palin et al. | |

It is certified that error appears in the above-identified patent and that said Letters Patent is hereby corrected as shown below:

Please enter previous claim 8 as current claim 5 as it was omitted from the patent:

--Claim 5. The system of claim 1 wherein said first diverter is structured, located and/or programmed to selectively: (i) supply sorbent material to the second mill through the serial mill feed stream; and/or (ii) supply sorbent material to the duct along a route that bypasses the second mill.--

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,215,575 B2 | |
| APPLICATION NO. | : 12/359604 | |
| DATED | : July 10, 2012 | |
| INVENTOR(S) | : Palin et al. | |

It is certified that error appears in the above-identified patent and that said Letters Patent is hereby corrected as shown below:

Delete the title page and substitute therefor the attached title page showing the corrected number of claims in patent.

Column 12, line 15, please enter previous claim 8 as current claim 5 as it was omitted from the patent:

--Claim 5. The system of claim 1 wherein said first diverter is structured, located and/or programmed to selectively: (i) supply sorbent material to the second mill through the serial mill feed stream; and/or (ii) supply sorbent material to the duct along a route that bypasses the second mill.--

This certificate supersedes the Certificate of Correction issued October 2, 2012.

Signed and Sealed this
Sixth Day of November, 2012

David J. Kappos
*Director of the United States Patent and Trademark Office*

CERTIFICATE OF CORRECTION (continued)

(12) United States Patent
Palin et al.

(10) Patent No.: US 8,215,575 B2
(45) Date of Patent: Jul. 10, 2012

(54) IN-LINE MILLING SYSTEM

(75) Inventors: Stephen C. Palin, Jamesville, NY (US); Jonathan Norman, Birdgeport, NY (US); Eric Fleckten, Kirkville, NY (US)

(73) Assignee: UCC Dry Sorbent Injection LLC, Waukegan, IL (US)

(*) Notice: Subject to any disclaimer, the term of this patent is extended or adjusted under 35 U.S.C. 154(b) by 124 days.

(21) Appl. No.: 12/359,604

(22) Filed: Jan. 26, 2009

(65) Prior Publication Data
US 2009/0194618 A1  Aug. 6, 2009

Related U.S. Application Data

(60) Provisional application No. 61/023,584, filed on Jan. 25, 2008.

(51) Int. Cl.
B02C 15/00 (2006.01)
B02C 23/02 (2006.01)

(52) U.S. Cl. .............. 241/135; 241/152.2; 241/166

(58) Field of Classification Search .............. 241/134, 241/135, 152.1, 152.2, 166
See application file for complete search history.

(56) References Cited

U.S. PATENT DOCUMENTS

| 3,734,414 A | * | 5/1973 | Weigel et al. ............ 241/40 |
| 4,026,479 A | | 5/1977 | Bradburn et al. |
| 4,691,869 A | | 9/1987 | Onuma et al. |
| 6,209,812 B1 | * | 4/2001 | Jokinen .................. 241/81 |
| 6,615,750 B2 | | 9/2003 | Durant et al. |

* cited by examiner

*Primary Examiner* — Faye Francis
(74) *Attorney, Agent, or Firm* — George R. McGuire; Frederick J M Price; Bond Schoeneck & King

(57) ABSTRACT

The present invention provides an in-line system for milling sorbent material to be used in a pneumatic conveying system. The system provides for optimal particle size in a duct injection system, regardless of the original sorbent particle size, and is designed to prevent clogging of the milled material through the system. Methods of operation for milling, as well as cleaning the mills while providing various sorbent material by-pass configurations to minimize system down-time while enhancing material throughput and that support the unique aspects of the system, are also described in detail below.

5 Claims, 4 Drawing Sheets